United States Patent [19]
Baker

[11] Patent Number: 6,113,511
[45] Date of Patent: Sep. 5, 2000

[54] GEARLESS TRANSMISSION FOR SPEED REDUCTION THROUGH ROLLING MOTION INDUCED BY WOBBLING MOTION

[75] Inventor: Kenneth Baker, 1436 Fisher St., Munster, Ind. 46321

[73] Assignee: Kenneth Baker, Munster, Ind.

[21] Appl. No.: 09/241,200

[22] Filed: Feb. 1, 1999

[51] Int. Cl.[7] ................................. F16H 23/10
[52] U.S. Cl. .................. 475/163; 475/165; 475/166; 476/68
[58] Field of Search ..................... 475/163, 165, 475/166; 476/55, 65, 66, 68; 74/86

[56] References Cited

U.S. PATENT DOCUMENTS

| | | | |
|---|---|---|---|
| 37,165 | 12/1862 | Gary | 475/163 |
| 792,477 | 6/1905 | Swedlund | 475/166 |
| 1,153,338 | 9/1915 | Rae | 475/166 |
| 1,330,393 | 2/1920 | Rae | 475/166 X |
| 1,560,161 | 11/1925 | Hopkins | 475/162 X |
| 1,616,369 | 2/1927 | Hartmann | 475/163 |
| 1,671,496 | 5/1928 | Trumpler | 475/163 |
| 1,671,497 | 5/1928 | Trumpler | 475/163 |
| 1,867,227 | 7/1932 | McCarthy | 192/59 |
| 1,883,601 | 10/1932 | Dauster | 192/59 |
| 2,025,472 | 12/1935 | Perry, Jr. | 192/83 |
| 2,293,731 | 8/1942 | Frederickson | 74/60 X |
| 3,385,135 | 5/1968 | Strandberg | 475/163 |
| 3,590,659 | 7/1971 | Maroth | 475/164 |
| 3,661,036 | 5/1972 | Quiram et al. | 475/166 X |
| 4,112,788 | 9/1978 | Stredda | 475/165 |
| 4,281,566 | 8/1981 | Brusasco | 475/164 |
| 4,366,726 | 1/1983 | Nilson | 475/163 |
| 4,515,028 | 5/1985 | VanDerLinden et al. | 475/166 |
| 4,550,630 | 11/1985 | Remus | 475/163 |
| 4,565,541 | 1/1986 | Obrecht | 464/155 |
| 4,597,483 | 7/1986 | Porel et al. | 192/59 |
| 4,599,910 | 7/1986 | Francis | 476/68 |
| 4,682,517 | 7/1987 | Francis et al. | 475/193 |
| 4,715,249 | 12/1987 | Tibbals, Jr. | 475/163 |
| 5,562,560 | 10/1996 | Kanamaru et al. | 475/163 |

FOREIGN PATENT DOCUMENTS

2076081  11/1981  United Kingdom.

*Primary Examiner*—Charles A Marmor
*Assistant Examiner*—Ankur Parekh
*Attorney, Agent, or Firm*—Hill & Simpson

[57] ABSTRACT

A gearless transmission is provided for transmitting rotational velocity from an input shaft to an output shaft without gears. The transmission includes an input shaft connected to a wedge. Both the input shaft and the wedge have rotational axes. The rotational axis of the input shaft is disposed at an angle with respect to the rotational axis of the wedge. As a result, rotation of the input shaft results in a processional motion of the axis of the wedge. The wedge engages an output plate which is connected to a universal joint which, in turn, is connected to an output shaft. The processional rotation of the wedge is transmitted to the output plate and, consequently, to the output shaft without the need for a geared or enmeshed relationship between the wedge and the output plate.

19 Claims, 5 Drawing Sheets

GEARLESS TRANSMISSION FOR SPEED REDUCTION THROUGH ROLLING MOTION INDUCED BY WOBBLING MOTION

FIELD OF THE INVENTION

The present invention relates generally to mechanisms that are used for transferring rotary motion from an input shaft to an output shaft through a flexible and/or angled joint such as a universal joint. The present invention also relates to such mechanisms which result in the transferring of rotary motion from a high speed input shaft to an output shaft whereby the speed is reduced between the input shaft to the output shaft by a large ratio, such as 100:1.

BACKGROUND OF THE INVENTION

Mechanisms that transfer rotary motion from an input shaft to an output shaft normally require gear lobes associated with each shaft and, consequently, include the disadvantages associated with the use of gears in general. Such disadvantages include lubrication requirements as well as fixed speed reduction capabilities. Further, there is a substantial amount of energy loss due to friction.

Accordingly, there is a need for an improved mechanism for transmitting rotary motion from an input shaft to an output shaft, at an angle which may be fixed or varied, and which further provides a speed reduction between the input shaft and the output shaft, all without the employment of gears or the reliance upon friction to transfer rotational movement from the input shaft to the output shaft.

SUMMARY OF THE INVENTION

The present invention satisfies the aforenoted needs by providing a gearless transmission that operates using the same principles as a coin rolling over a table in a circular path on its outer peripheral edge without slipping or sliding. As the coin or flat disk rotates about a perpendicular axis through the horizontal tabletop, the coin will make less than one revolution before completing its circular path if the distance between the edge of the coin and the center point of rotation located on the tabletop is less than the radius of the coin. As a result, the inventor has found that this relationship can be employed to produce a variable speed reducing gearless transmission.

In an embodiment, the gearless transmission of the present invention comprises an input shaft having two ends. One end of the input shaft is connected to a power source that provides rotational movement to the input shaft and a second end of the input shaft is connected to a wedge. The wedge is connected to the input shaft at an angle so that the rotational axis of the input shaft and the rotational axis of the wedge are disposed at an angle with respect to each other. The wedge is disposed between the end of the input shaft and an output plate so that the wedge abuttingly engages the output plate. Thrust bearings are disposed between the wedge and the output plate. The output plate is connected to a first joint member of the universal joint which further comprises a second joint member. The first joint member pivotally connects the output plate to the second joint member and the second joint member connects the universal joint to an output shaft.

As a result of the angled connection between the wedge and the input shaft, rotation of the input shaft results in a wobble-type rotation of the wedge in an manner similar to the way a coin spins on a flat tabletop as the angle between the horizontal surface of the tabletop and the face of the coin decreases to an angle of less than 90° and approaches 0°. The wobbling rotation of the wedge is transferred to the output plate without the need for enmeshed gears disposed on the wedge or the output plate. Instead, thrust bearings are disposed between the output plate and the wedge thereby providing a frictionless or near-frictionless connection between the wedge and the output plate. As a result, rotational movement is transmitted from the input shaft to the output shaft with a minimal frictional loss. Further, speed reduction is provided and can be controlled by adjusting the angle at which the wedge is connected to the input shaft. Specifically, the output/input speed reduction ratio is provided by a geometric formula as described below.

In an embodiment, the output plate comprises a cylinder having a closed end which is engaged by the wedge and an open end which extends over the universal joint.

In an embodiment, the transmission further comprises a support frame that comprises an end plate through which the output shaft passes. In such an embodiment, a spring is trapped between the output plate and the end plate.

In an embodiment, the transmission further comprises a support frame comprising an end plate through which the input shaft passes. At least one counter balancing weight is mounted to the input shaft between the end plate and the wedge.

In an embodiment, a spring may be trapped between the counter balancing weight and the end plate.

In an embodiment, the transmission comprises a support frame comprising an end plate through which the input shaft passes and wherein at least one counter balancing weight is mounted to the input shaft between the end plate and the power source.

In an embodiment, the present invention comprises a support frame comprising an end plate through which the input shaft passes and wherein at least two counter balancing weights are mounted to the input shaft including a first weight mounted between the end plate and the wedge and a second weight mounted between the end plate and the power source.

In an embodiment, the transmission of the present invention further comprises a spring trapped between one of the counter balancing weights and the end plate.

In an embodiment, the transmission further comprises a drive shaft that connects the output plate to the first joint member of the universal joint.

In an embodiment, the first joint member of the universal joint comprises an aperture which matably receives an end of the drive shaft. The transmission further comprises a spring that extends between the end of the drive shaft and the second joint member and through the aperture of the first joint member.

In an embodiment, the second joint member of the universal joint comprises a first end pivotally connected to the first joint member and a second end which comprises an opening that matably receives the output shaft. The universal joint further comprises a connecting shaft that connects the first end of the second joint member to the first joint member. The second joint member also accommodates a spring trapped between the connecting shaft and the output shaft.

In an embodiment, the input shaft is pivotally connected to the wedge so that the angle at which the central rotational axis of the input shaft is disposed with respect to the central rotational axis of the wedge may be varied. In such an embodiment, the transmission further comprises an actuator connected to the wedge for pivoting the wedge with respect to the input shaft and varying the angular relationship between the central rotational axis of the input shaft and the central rotational axis of the wedge.

In an embodiment, the output plate of the transmission of the present invention engages a stationary plate during the rotation of the output plate.

In an embodiment, the transmission of the present invention further comprises a support frame comprising an end plate through which the output shaft passes and wherein the output plate engages a stationary plate during rotation of the output plate. The stationary plate is disposed between the support frame and the output plate.

In an embodiment, the gearless transmission of the present invention further comprises thrust bearing disposed between the wedge and the output plate.

In an embodiment, the gearless transmission of the present invention comprises an input shaft comprising a first end connected to a power source and a second end connected to a wedge. The input shaft has a rotational axis and the wedge has a rotational axis. The rotational axis of the input shaft is disposed at an angle with respect to the rotational axis of the wedge. The wedge abuttingly engages an output plate which is connected to a drive shaft. The drive shaft is connected to a female joint member of a universal joint which also comprises a male joint member. The female joint member is pivotally connected to the male joint member by a connecting shaft. The male joint member is thereafter connected to an output shaft.

In an embodiment, the transmission of the present invention comprises an input shaft that connects a wedge to a power source. The rotational axis of the input shaft is disposed at an angle with respect to the rotational axis of the wedge. The wedge abuttingly engages an output plate which is connected to the first end of a universal joint which further comprises a second end that is connected to an output shaft. The universal joint pivotally connects the output plate to the output shaft.

In such an embodiment, the transmission may further comprise a support housing through which the output shaft passes and wherein the output plate engages a stationary plate during rotation of the output plate. In such an embodiment, the stationary plate is disposed between the support housing and the output plate.

It is therefore an advantage of the present invention to provide a gearless transmission.

Another advantage of the present invention is that it provides a variable speed reducer for transmitting rotational movement from an input shaft to an output shaft without the need for enmeshed gears.

Another advantage of the present invention is that it provides a soft-start coupling between an input shaft and an output shaft.

Other objects and advantages of the present invention will become apparent upon reading the following detailed description and appended claims, and upon reference to the accompanying drawings.

BRIEF DESCRIPTION OF THE DRAWINGS

The present invention is illustrated more or less diagrammatically in the following drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Like numerals will be used to refer to like or similar parts from figure to figure in the following description of the drawings.

Figure 1:
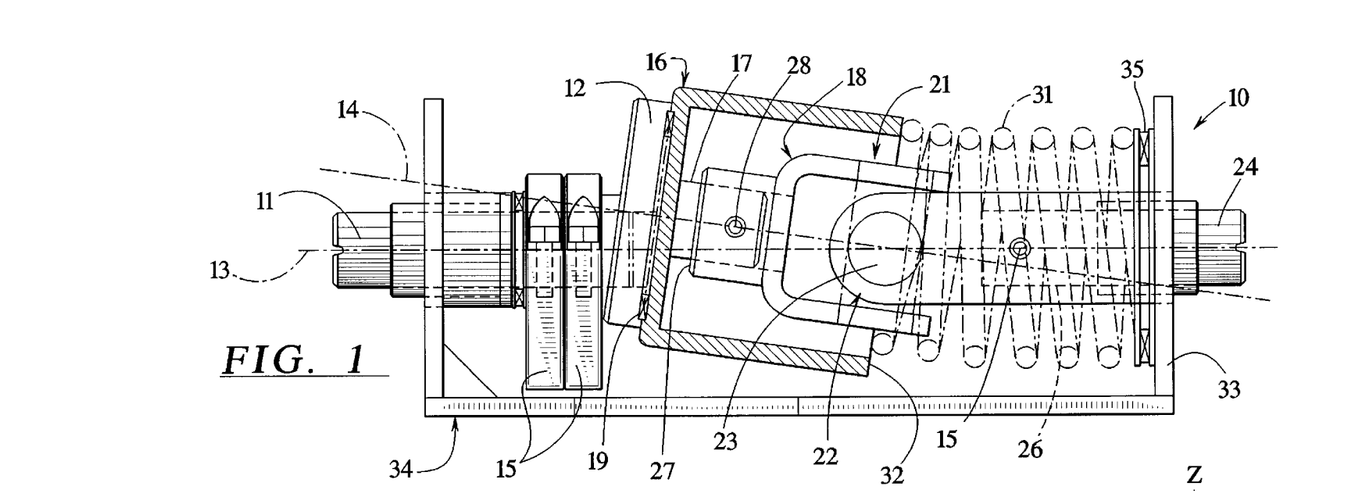
FIG. 1 is a sectional view of a gearless transmission made in accordance with the present invention.

An exemplary embodiment of a gearless transmission 10 is illustrated in FIG. 1. An input shaft 11 is connected to a wedge 12 at an angle as illustrated by the angular relationship between the central rotational axis 13 of the input shaft 11 and the central rotational axis 14 of the wedge 12. Counter balances 15 are mounted to the input shaft 11. While the wedge 12 is fixedly connected to the input shaft 11 in the embodiment 10 shown in FIG. 1, it will be noted that the angular relationship between the wedge 12 and the input shaft 11 may be varied as illustrated with respect to the embodiment 10b shown in FIG. 6 and discussed below.

Returning to FIG. 1, the wedge 12 is not fixedly connected to the output plate 16 which, in the embodiment shown in FIG. 1, is in the form of a cylinder, but the wedge 12 instead abuttingly engages the output plate 16 with thrust bearings 19 disposed therebetween. The output plate 16 is connected to a drive shaft 17 which, in turn, is connected to a female joint member 18 of a universal joint 21. The universal joint 21 also includes a male joint member 22 which is pivotally connected to the female joint member 18 by a connecting shaft 23. The male joint member 22 is connected to an output shaft 24 by a connecting pin 25. In the embodiment 10 illustrated in FIG. 1, the male joint member 22 includes an open end 26 that matably receives the output shaft 24. The connecting pin 25 passes through both the output shaft 24 and the male joint member 22. Similarly, the female joint member 18 includes an open end 27 which matably receives the drive shaft 17. A connecting pin 28 passes through both the drive shaft 17 and the female joint member 18 as illustrated.

Pre-loading springs may be provided in a variety of places in the transmission 10. By way of example, a pre-loading spring 31 may be trapped between the open end 32 of the output plate structure 16 and the end plate 33 of the support housing 34. A thrust bearing 35 is provided between the spring 31 and the end plate 33.

As a result of the wobbling rotational movement of the wedge 12 due to the angular connection between the wedge 12 and the input shaft 11, rotational movement is transmitted between the wedge 12 and the output plate 16 without any fixed or frictional connection between the two components. Further, rotational movement is transmitted between the wedge 12 and the output plate 16 with frictionless or near-frictionless thrust bearings 17 disposed between the wedge 12 and output plate 16. As a result, a gearless transmission 10 is provided.

Figure 2:
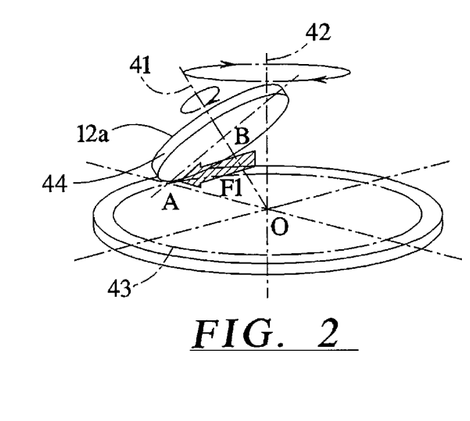
FIG. 2 is a perspective schematic diagram illustrating the rotation of a flat disk, such as a coin, on a flat horizontal surface, such as a tabletop.
Figure 3:
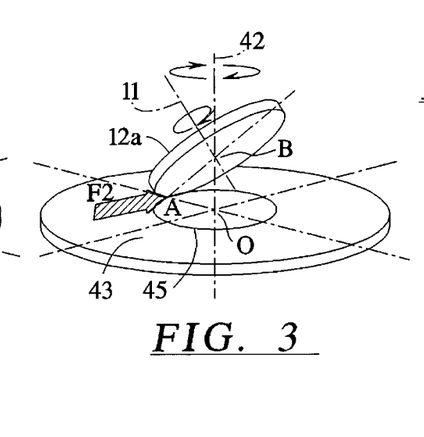
FIG. 3 is another perspective schematic illustration of a rotation of a flat disk on a horizontal surface.
Figure 4:
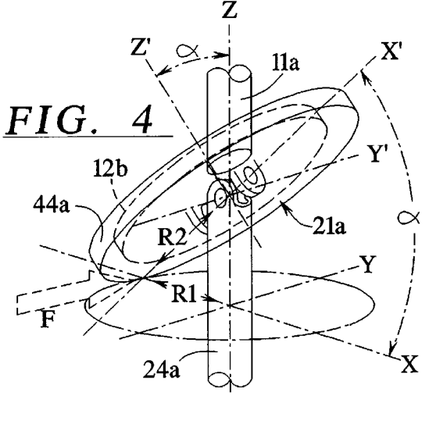
FIG. 4 is a schematic perspective illustration applying the rotational movement illustrated in FIGS. 2 and 3 to an input shaft, an output shaft and a universal joint.

The speed reducing capabilities of the transmission 10 are further explained in FIGS. 2–4. Referring to FIG. 2, a flat disk 12a is illustrated which corresponds to the wedge 12 of FIG. 1. The coin 12a is rotating about its central axis 41 and further is traveling about the central axis 42 of the horizontal surface 43 without slipping or sliding. The forces F1 including friction and momentum act on the edge 44 of the coin 12a causing it to rotate in the counter-clockwise direction about the axis 41 according to Equation 1:

$$2\Pi \cdot [AO/AB] \text{ radians per revolution (counter-clockwise)} \quad (1)$$

However, with each revolution about the axis 42 in the clockwise direction, the disk 12a also makes on full rotation clockwise around the axis 41 and, due to a rotation of the axis 41 about the axis 42, the net rotation of the disk 12a about the axis 41 is provided by Equation 2:

$$2\Pi \cdot ([AO/AB]-1) \text{ radians per revolution (counter-clockwise)} \quad (2)$$

Turning to FIG. 3, it will be noted that the disk 12a is positioned with its center B disposed along the axis 42. In this case, the circumference of the disk 12a is greater than the length of the path 45 over the surface 43. The radius AB is greater than the radius AO. As the disk 12a revolves, it makes one full rotation in the clockwise direction about the axis 41, but due to the rotation of the axes, it makes less than one complete rotation in the counter-clockwise direction due to the forces F2 acting tangentially on the disk 12a. The net result is a rotation of the disk 12a about the axis 41 according to Equation 3:

$$2\Pi \cdot [(AO/AB)-1] \text{radians per revolution (clockwise)} \quad (3)$$

Applying these rotation principles to a transmission, it is shown in FIG. 4 that a disk 12b may be attached to an input shaft 11a and the disk 12b may be coupled to an output shaft 24a with a universal joint 21a as described above and below in the working embodiment. Referring to FIG. 4, the radius R1 is defined by Equation 4 as follows:

$$(\text{Radius}) R_1 = R_2 \cdot \cos \alpha \text{ (where } R_2 \text{ is in the X'-Y' plane)} \quad (4)$$

Any force F acting tangentially on the edge 44a of the plate 12b will produce a torque about the z' axis which is $R_2/R_1$ times greater than it is about the Z axis in accordance with Equation 5:

$$(F) \cdot R_1 = (F) \cdot R_2 \cos \alpha \quad (5)$$

As a result, rotation of the Z' axis results in a rotation of the Z axis.

Figure 5:
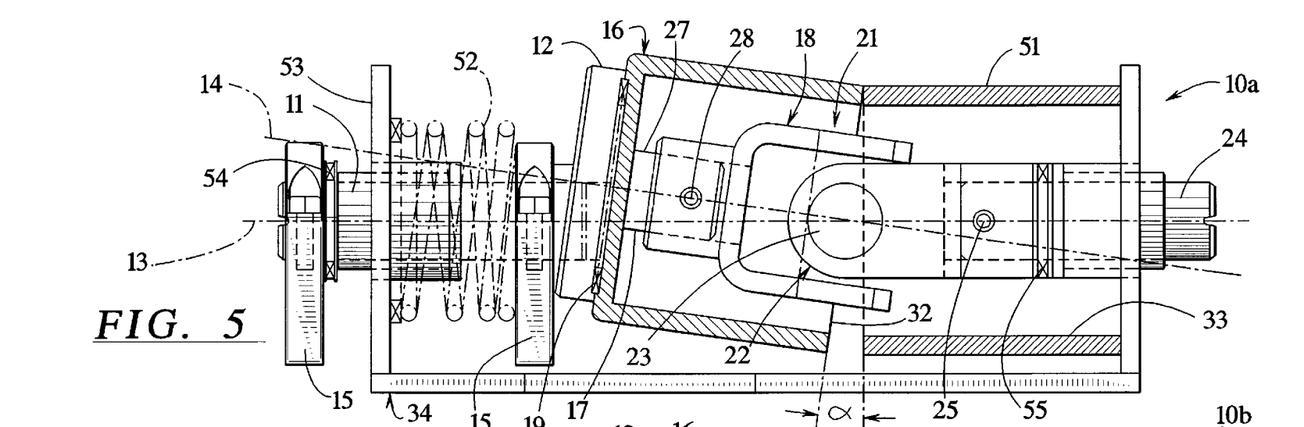
FIG. 5 is a sectional view of another embodiment of the gearless transmission of the present invention.

FIG. 1 illustrates one way in which the wedge 12 can be supported, i.e. by an output plate 16 that is thereafter supported on a drive shaft 17 which, in turn, is connected to a universal joint 21 and output shaft 24. Referring to FIG. 5, it is shown that the wedge 12 may be supported indirectly by a cylinder 51 which is analogous to the table or horizontal surface 43 shown in FIGS. 2 and 3. The cylinder 51 can be used in addition to or in place of the spring 31 shown in FIG. 1. Also shown in FIG. 5 is the employment of a spring 52 disposed between the end plate 53 and the counter balancing weight 15 that is disposed between the end plate 53 and the wedge 12 and which is mounted to the input shaft 11. Additional thrust bearings are shown at 54, 55.

Figure 6:
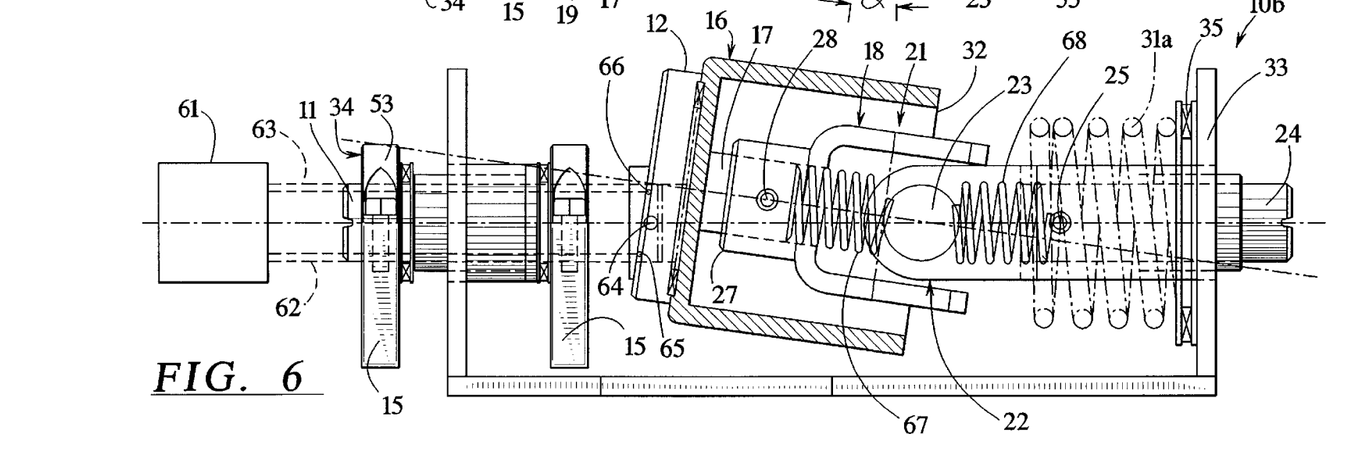
FIG. 6 is a sectional view of yet another alternative embodiment of the gearless transmission made in accordance with the present invention.

Turning to FIG. 6, an actuator 61 is provided that is connected to the wedge 12 by way of tie rods 62, 63. The wedge 12 is pivotally connected to the input shaft 11 at the pin 64. Movement of the tie rod 62, 63 enables the angular relationship between the wedge 12 and the input shaft 11 to be adjusted. The actuator may be of a hydraulic type or mechanical (gear) type. The tie rods 62, 63 are connected to the wedge 12 at the connecting points 65, 66 respectively.

Additionally, FIG. 6 illustrates the employment of a spring 67 accommodated in the female joint member 18 between the drive shaft 17 and the male joint member 22. Further, a spring 68 is disposed within the male joint member 22 between the connecting shaft 23 and the output shaft 24. Additionally, a spring 31a may be employed in a manner similar to that shown in FIG. 1. The spring 31a is only partially shown in FIG. 6.

Figure 7:
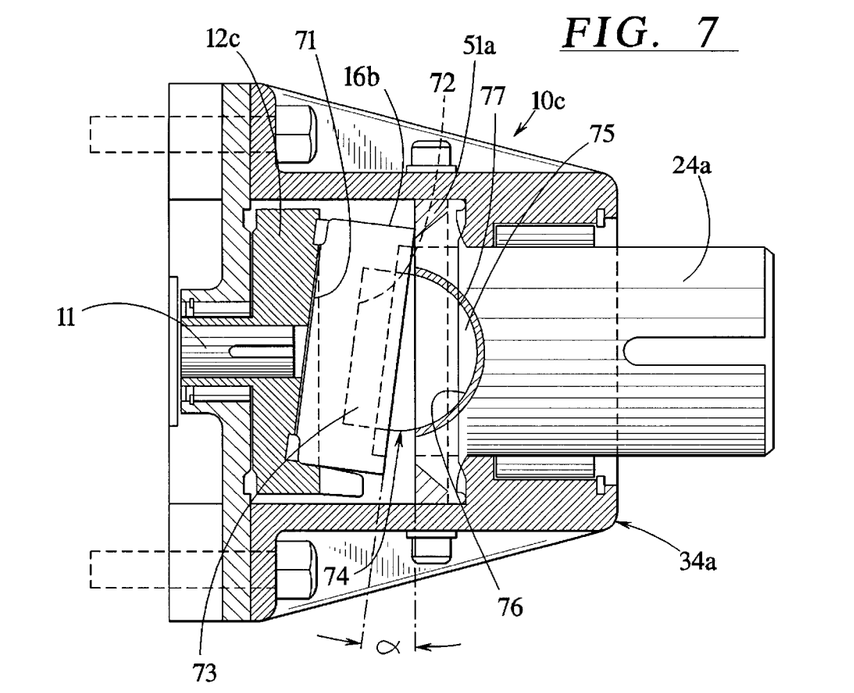
FIG. 7 is a sectional view of still another embodiment of the gearless transmission made in accordance with the present invention.

Turning to FIG. 7, a third transmission 10c is illustrated which includes an input shaft 11 connected to a wedge 12c. The wedge 12c has an angled face 71 (see also FIG. 8) for receiving the output plate 16b. The output plate 16b includes a recess 72 for receiving a first end 73 of a universal joint 74. The universal joint 74 also includes a second curved end 75 which is received in a corresponding curved slot 76 of the output shaft 24a. The slot 76 is lined with bearings 77 for providing a near friction-free connection between the second end 75 of the universal joint 74 and the output shaft 24a. The transmission 10c is a speed reducing transmission with an output/input speed reduction ratio defined by Equation 6:

$$2\Pi \cdot [\cos \alpha - 1] \text{ radians per revolution (same direction)} \quad (6)$$

Figure 8:
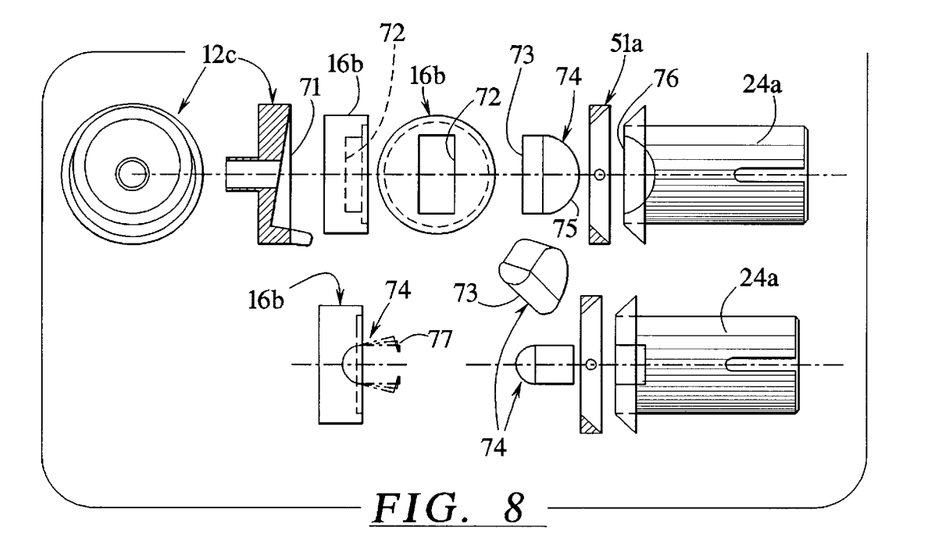
FIG. 8 is an exploded view of selected components of the gearless transmission shown in FIG. 7.

Still referring to FIGS. 7 and 8, the output plate 16b engages a thin fixed cylinder 51a (see also the cylinder 51 shown in FIG. 5). In this case, the cylinder 51a is an annular ring (see FIG. 8) which is trapped between the housing 34a and the output plate 16b.

Figure 9:
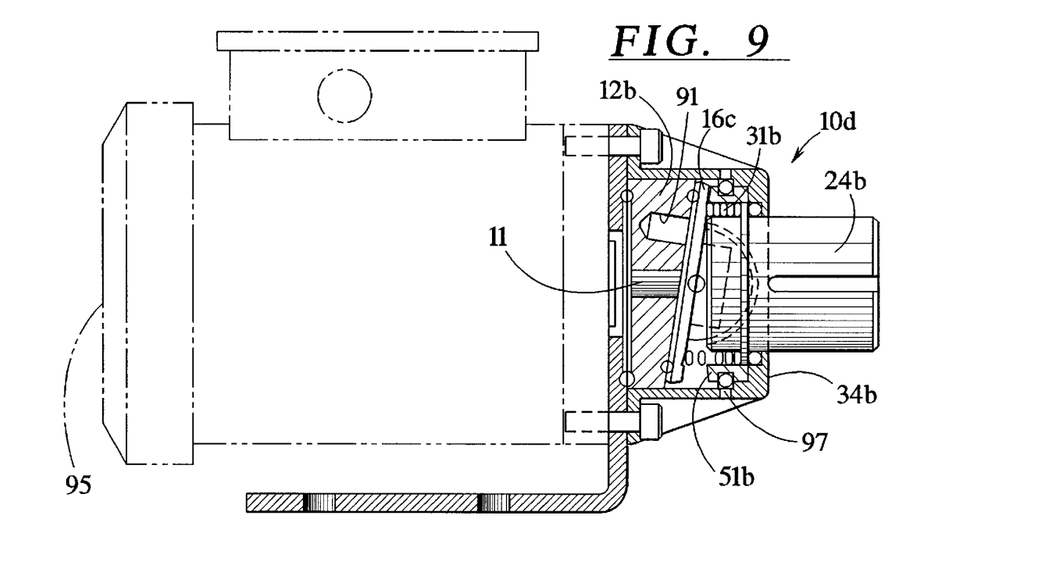
FIG. 9 is a sectional view of another embodiment of the gearless transmission made in accordance with the present invention.
Figure 10:
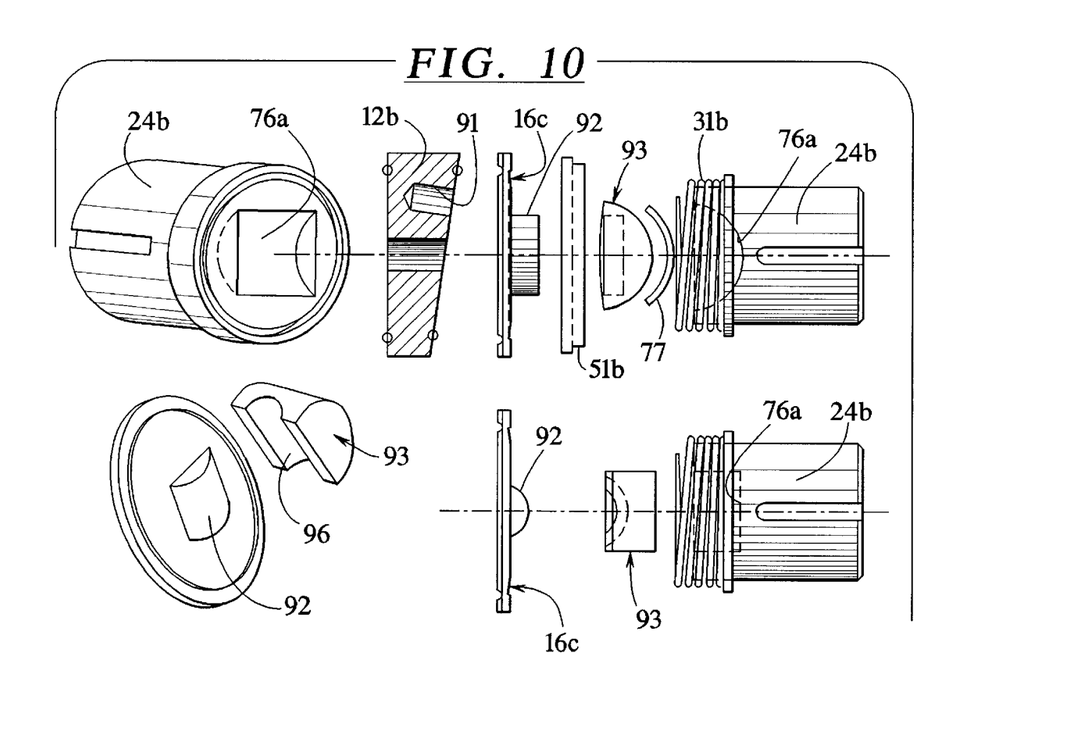
FIG. 10 is an exploded view of selected components of the gearless transmission illustrated in FIG. 9.

Turning to FIG. 9, an embodiment 10d is illustrated that is similar to the embodiment 10c is illustrated in FIG. 7 except that the output plate 16c is rotated against a restraint spring 31b as well as a fixed cylinder 51b. The wedge 12d is equipped with a hole 91 for a counter balancing effect. The output plate 16c is also equipped with a male joint member 92 of a universal joint. The female joint member 93 again is accommodated in a curved slot 76a of the output shaft 24b. Again, bearings 77 are disposed between the female universal joint member 93 and the output shaft 24*b*. A power source for rotating the input shaft 11 is shown at 95. The male member 92 is received in the slot 96 of the female joint member 93. A one-way bearing 97 is disposed between the cylinder 51*b* and the housing 34*b*. The one-way bearing 97 allows nearly frictionless rotation in one direction (i.e. the same direction as the rotation of the input shaft 11) while completely restricting rotation in the opposite direction. The spring 31*b* serves as the "table" over which the "coin" can roll as illustrated above in FIGS. 2 and 3. The effect of the thrust of the coin down the coils of the spring provides a speed reduction ratio of approximately 100:1 until such a time as the angular velocity of the load catches up with the rotational velocity of the input shaft 11. Then, the spring 31*b* begins to act as a clutch delivering a gradually decreasing amount of available torque to the load and at ever increasing angular velocity up to the angular velocity of the input shaft 11 or reaching the minimum level of maintenance torque required by the load, whichever occurs first.

As indicated above with respect to FIG. 7, the speed reduction ratio is determined by the angle of incline α between the Z axis and the Z' axis (see also FIG. 4). Therefore, by employing an actuation system such as the actuator 61 and tie rods 62, 63 illustrated in FIG. 6, the speed reduction ratio can be altered.

Figure 11:
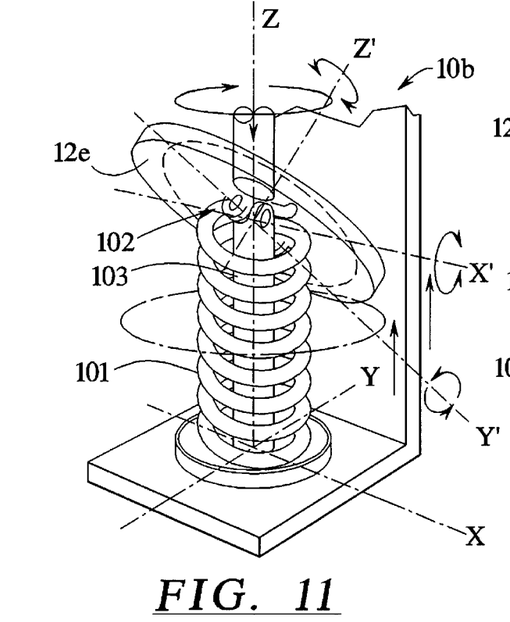
FIG. 11 is a perspective view of another embodiment of a gearless transmission made in accordance with the present invention.

FIG. 11 illustrates an alternative embodiment 10*d* whereby the wedge 12*e* is engaged by a spring 101 to control nutation. The spring 101 applies force to the wedge 12*e* to push the wedge 12*e* to a position parallel to the X-Y plane. A component of the force of the spring acts on the Y' axis to create a moment about the X' axis and vice versa. This results in an alternating resistance to the rotation of the axles of the universal joint 102. The wedge 12*e* cannot slide over the spring because the spring, shaft 103, universal joint 102 and wedge 12*e* all rotate together. Neither can the wedge 12*e* roll over the spring 101.

Figure 12:
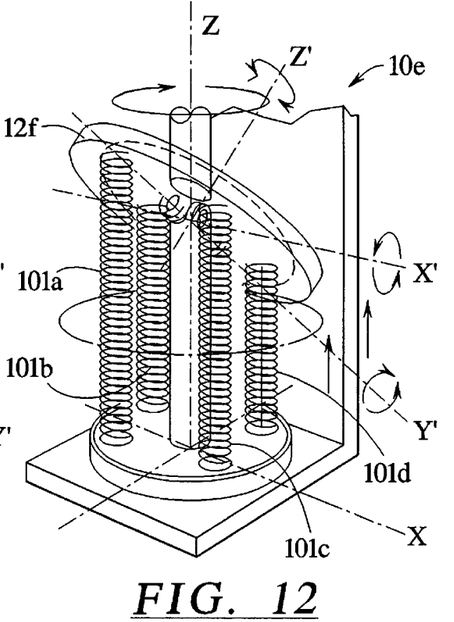
FIG. 12 is a perspective view of another embodiment of a gearless transmission made in accordance with the present invention.

Turning to FIG. 12, yet another embodiment 10*e* is illustrated which is based upon the same principle as illustrated above in FIG. 11. The internal restraint is provided by individual springs 101*a*–101*d*. By revolving, the wedge 12*f* is required to bend the springs 101*a*–101*d* but also to depress and stretch them in an alternating and revolving sequence. At the lowest point as the wedge 12*f* passes over one of the springs and begins to encounter the resistive component of the next spring, the decompressing force of the prior spring actually facilitates the revolving motion of the wedge 12*f*. This is analogous to capturing the energy loss as heat is given off by a friction clutch and returning a portion of the energy to the driving source that produced the rotation.

Figure 13:
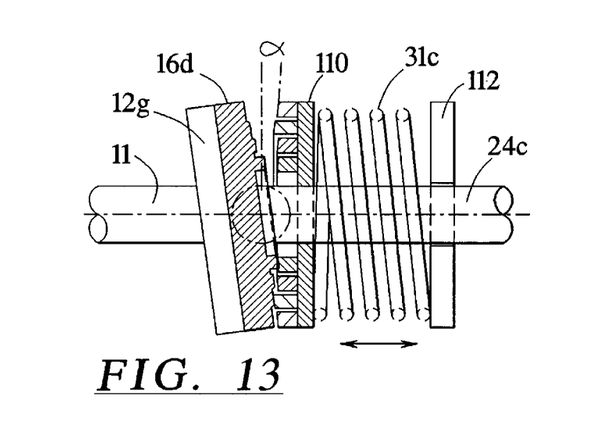
FIG. 13 is a schematic illustration of a five speed gearless transmission made in accordance with the present invention.
Figure 14:
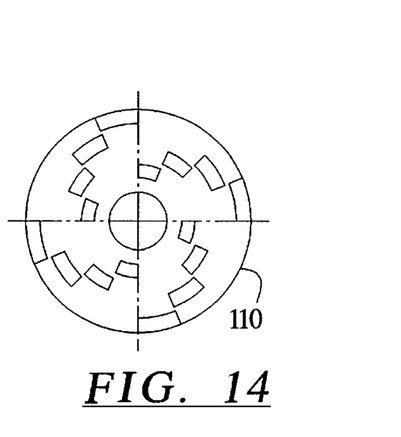
FIG. 14 is a plan view of the rotary selector plate illustrated in FIG. 13.
Figure 15:
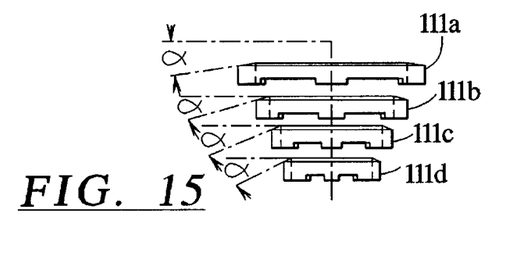
FIG. 15 is a series of plan views of the table cylinders illustrated in FIG. 13.

FIGS. 13–15 illustrate a theoretical way to provide a five speed power transmission in accordance with the present invention. The input shaft 11 is connected to a wedge 12*g*. The wedge 12*g* abuttingly engages an output plate 16*d* which in turn engages a rotary selector plate 110. The rotary selector plate is connected to an output shaft 24*c*. As discussed above, the speed reduction ratio is based upon the angle a between the lower face of the output plate 16*d* and the rotary selector plate 110. By providing a variety of engaging faces on the rotary selector plate 110, a variety of angles α can be provided. In this embodiment, a spring 31*c* supports the rotary selector plate 110 and serves as a clutch between the shift selections. The plurality of table cylinders 111*a*–111*d* that are mounted to the rotary selector plate 110 are illustrated in FIG. 15. A plan view of the rotary selector plate 110 is illustrated in FIG. 14. A moving spring support plate 112 may also be provided which can be used to change the compression of the spring 31.

From the above description, it is apparent that the advantages and objects of the present invention have been achieved. While only certain embodiments have been set forth, alternative embodiments and various modifications will be apparent from the above description to one skilled in the art. These and other alternatives are considered equivalents and within the spirit and scope of the present invention.

What is claimed:

1. A gearless transmission comprising:
an input shaft comprising a first end connected to a power source and a second end connected to a wedge, the input shaft having a rotational axis, the wedge having a rotational axis, the rotational axis of the input shaft being disposed at an angle with respect to the rotational axis of the wedge, the wedge comprising a flat surface, the transmission further comprising an output plate that comprises a flat surface with thrust bearings disposed between the flat surface of the wedge and the flat surface of the output plate, the flat surface of the wedge constantly abuttingly engaging the flat surface of the output plate through the thrust bearings during rotation of the wedge and the output plate without any connecting elements disposed between the wedge and the output plate that penetrate the flat surfaces of either the wedge or the output plate, the output plate connected to a first joint member of a universal joint which further comprises a second joint member, the first joint member pivotally connecting the output plate to the second joint member, the second joint member connected to an output shaft,
the input shaft being pivotally connected to the wedge so that the angle at which the central rotational axis of the input shaft is disposed with respect to the central rotational axis of the wedge may be varied.

2. The gearless transmission of claim 1 wherein the output plate comprises a cylinder having a closed end which is engaged by the wedge and an open end which extends over the universal joint.

3. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, the transmission further comprising a support frame comprising an end plate through which the output shaft passes and a spring trapped between the output plate and the end plate.

4. The gearless transmission of claim 1 further comprising a support frame comprising an end plate through which the input shaft passes and at least one counter balancing weight mounted to the input shaft between the end plate and the wedge.

5. A gearless transmission comprising:
an input shaft comprising a first end connected to a power source and a second end connected to a wedge, the input shaft having a rotational axis the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, the transmission further comprising a spring trapped between the counter balancing weight and the end plate.

6. The gearless transmission of claim 1 further comprising a support frame comprising an end plate through which the input shaft passes and at least one counter balancing weight mounted to the input shaft between the end plate and the power source.

7. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, the transmission further comprising a support frame comprising an end plate through which the input shaft passes and a first counter balancing weight mounted to the input shaft between the end plate and the power source and a second counter balancing weight mounted to the input shaft between the end plate and the wedges, the transmission comprising a spring trapped between the second counter balancing weight and the end plate.

8. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, the transmission further comprising an drive shaft that connects the output plate to the first joint member, the first joint member comprises an aperture which matably receives an end of the drive shaft, the transmission further comprising a spring that extends between said end of the drive shaft and the second joint member and through said aperture.

9. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, wherein the second joint member comprises a first end pivotally connected to the first joint member and a second end comprising an opening that matably receives the output shaft, the universal joint further comprising a connecting shaft that connects the first end of the second joint member to the first joint member, the second joint member accommodating a spring trapped between the connecting shaft and the output shaft.

10. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a first joint member of a universal joint which further comprises a second joint member, the first joint member pivotally connecting the output plate to the second joint member, the second joint member connected to an output shaft, wherein the input shaft is pivotally connected to the wedge so that the angle at which the central rotational axis of the input shaft is disposed with respect to the central rotational axis of the wedge may be varied.

11. The gearless transmission of claim 10 further comprising an actuator connected to the wedge for pivoting the wedge with respect to the input shaft and varying said angle.

12. The gearless transmission of claim 1 wherein the output plate engages a stationary plate during rotation of the output plate.

13. The gearless transmission of claim 1 further comprising a support frame comprising an end plate through which the output shaft passes and wherein the output plate engages a stationary plate during rotation of the output plate, the stationary plate being disposed between the support frame and the output plate.

14. A gearless transmission comprising:
an input shaft comprising a first end connected to a power source and a second end connected to a wedge, the input shaft having a rotational axis, the wedge having a rotational axis, the rotational axis of the input shaft being disposed at an angle with respect to the rotational axis of the wedge, the wedge comprising a flat surface, the transmission further comprising an output plate that comprises a flat surface with thrust bearings disposed between the flat surface of the wedge and the flat surface of the output plate, the flat surface of the wedge constantly abuttingly engaging the flat surface of the output plate through the thrust bearings during rotation of the wedge and the output plate without any connecting elements disposed between the wedge and the output plate that penetrate the flat surfaces of either the wedge or the output plate, the output plate connected to a drive shaft, the drive shaft connecting the output plate to a female joint member of a universal joint which further comprises a male joint member, the female joint member pivotally connected to the male joint member by a connecting shaft, the male joint member connected to an output shaft,
the gearless transmission further comprising a support frame comprising an end plate through which the output shaft passes and a spring trapped between the output plate and the end plate.

15. A gearless transmission comprising:
an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge the wedge abuttingly engaging an output plate, the output plate connected to a drive shaft, the drive shaft connecting the output plate to a female joint member of a universal joint which further comprises a male joint member, the female joint member pivotally connected to the male joint member by a connecting shaft, the male joint member connected to an output shaft, wherein the input shaft is pivotally connected to the wedge so that the angle at which the central rotational axis of the input shaft is disposed with respect to the central rotational axis of the wedge may be varied.

16. A gearless transmission comprising:

an input shaft comprising a first end connected to a power source and a second end connected to a wedge, the input shaft having a rotational axis, the wedge having a rotational axis, the central rotational axis of the input shaft being disposed at an angle with respect to the central rotational axis of the wedge, the wedge abuttingly engaging an output plate, the output plate connected to a drive shaft, the drive shaft connecting the output plate to a female joint member of a universal joint which further comprises a male joint member, the female joint member pivotally connected to the male joint member by a connecting shaft, the male joint member connected to an output shaft, the transmission further comprising an actuator connected to the wedge for pivoting wedge with respect to the input shaft and varying said angle.

17. A gearless transmission comprising:

an input shaft comprising a first end connected to a power source and a second end connected to a wedge, the input shaft having a central rotational axis, the wedge having a central rotational axis, the central rotational axis of the input shaft being disposed at an angle with respect to the central rotational axis of the wedge, the wedge abuttingly engaging an output plate through thrust bearings disposed between the wedge and the output plate, the output plate connected to a drive shaft, the drive shaft connecting the output plate to a female joint member of a universal joint which further comprises a male joint member, the female joint member pivotally connected to the male joint member by a connecting shaft, the male joint member connected to an output shaft, the input shaft being pivotally connected to the wedge so that the angle at which the central rotational axis of the input shaft is disposed with respect to the central rotational axis of the wedge may be varied, the gearless transmission further comprising a support frame comprising an end plate through which the output shaft passes and a spring trapped between the output plate and the end plate.

18. A gearless transmission comprising:

an input shaft comprising a first end connected to a power source and a second end connected to a wedge, the input shaft having a rotational axis, the wedge having a rotational axis, the rotational axis of the input shaft being disposed at an angle with respect to the rotational axis of the wedge, the wedge comprising a flat surface, the transmission further comprising an output plate that comprises a flat surface with thrust bearings disposed between the flat surface of the wedge and the flat surface of the output plate, the flat surface of the wedge constantly abuttingly engaging the flat surface of the output plate through the thrust bearings during rotation of the wedge and the output plate without any connecting elements disposed between the wedge and the output plate that penetrate the flat surfaces of either the wedge or the output plate, the output plate connected to a first end of a universal joint which further comprises a second end that is connected to an output shaft, the universal joint pivotally connecting the output plate to the output shaft, the input shaft being pivotally connected to the wedge so that the angle at which the central rotational axis of the input shaft is disposed with respect to the central rotational axis of the wedge may be varied, the gearless transmission further comprising a support frame comprising an end plate through which the output shaft passes and a spring trapped between the output plate and the end plate.

19. The gearless transmission of claim 18 further comprising a support housing through which the output shaft passes and wherein the output plate engages a stationary plate during rotation of the output plate, the stationary plate being disposed between the support housing and the output plate.

* * * * *